(12) United States Patent
Oh et al.

(10) Patent No.: US 12,021,239 B2
(45) Date of Patent: Jun. 25, 2024

(54) NEGATIVE ELECTRODE FOR RECHARGEABLE LITHIUM BATTERY AND RECHARGEABLE LITHIUM BATTERY INCLUDING SAME

(71) Applicant: SAMSUNG SDI CO., LTD., Yongin-si (KR)

(72) Inventors: Seyoung Oh, Yongin-si (KR); Dongwan Seo, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 581 days.

(21) Appl. No.: 16/889,905

(22) Filed: Jun. 2, 2020

(65) Prior Publication Data

US 2020/0381735 A1    Dec. 3, 2020

(30) Foreign Application Priority Data

Jun. 3, 2019    (KR) .................... 10-2019-0065538

(51) Int. Cl.
*H01M 4/62* (2006.01)
*C08G 69/00* (2006.01)
*H01M 4/38* (2006.01)
*H01M 10/052* (2010.01)
*H01M 10/0525* (2010.01)
*H01M 4/02* (2006.01)

(52) U.S. Cl.
CPC ............ *H01M 4/622* (2013.01); *C08G 69/00* (2013.01); *H01M 4/386* (2013.01); *H01M 4/623* (2013.01); *H01M 10/052* (2013.01); *H01M 10/0525* (2013.01); *H01M 2004/027* (2013.01)

(58) Field of Classification Search
CPC ...... H01M 4/621; H01M 4/622; H01M 4/623; H01M 4/386; H01M 10/052; H01M 10/0525; C08J 7/0427
See application file for complete search history.

(56) References Cited

U.S. PATENT DOCUMENTS

| | | | |
|---|---|---|---|
| 2006/0099505 A1* | 5/2006 | Fujino | H01M 4/621 29/623.5 |
| 2008/0003506 A1 | 1/2008 | Suzuki et al. | |
| 2012/0189898 A1* | 7/2012 | Wakizaka | H01M 50/449 429/144 |
| 2013/0288120 A1* | 10/2013 | Iida | H01L 31/0481 524/592 |
| 2014/0186680 A1* | 7/2014 | Kim | H01M 50/40 429/144 |
| 2018/0366732 A1 | 12/2018 | Yano et al. | |

(Continued)

FOREIGN PATENT DOCUMENTS

| | | | | |
|---|---|---|---|---|
| EP | 3691004 A1 * | 5/2020 | | H01M 4/62 |
| KR | 10-2007-0041785 A | 4/2007 | | |

(Continued)

*Primary Examiner* — Jeremiah R Smith
(74) *Attorney, Agent, or Firm* — Lee IP Law, P.C.

(57) ABSTRACT

A negative electrode for a rechargeable lithium battery and a rechargeable lithium battery including the electrode, the negative electrode including a negative active material layer including a silicon (Si)-containing negative active material and a binder, wherein the binder includes a copolymer including an amide group-containing first repeating unit, a cyano group-containing second repeating unit, and a sulfonate group-containing third repeating unit.

15 Claims, 1 Drawing Sheet

(56) References Cited

U.S. PATENT DOCUMENTS

2019/0013523 A1* 1/2019 Shibuya ................. H01M 4/62
2021/0057747 A1* 2/2021 Sonobe ............. H01M 10/4235

FOREIGN PATENT DOCUMENTS

| KR | 10-2016-0061317 A | 5/2016 | |
|----|-------------------|--------|---|
| KR | 10-2017-0078624 A | 7/2017 | |
| KR | 10-2018-0095005 A | 8/2018 | |
| WO | WO-2019065471 A1 * | 4/2019 | ............ C08F 220/56 |

* cited by examiner

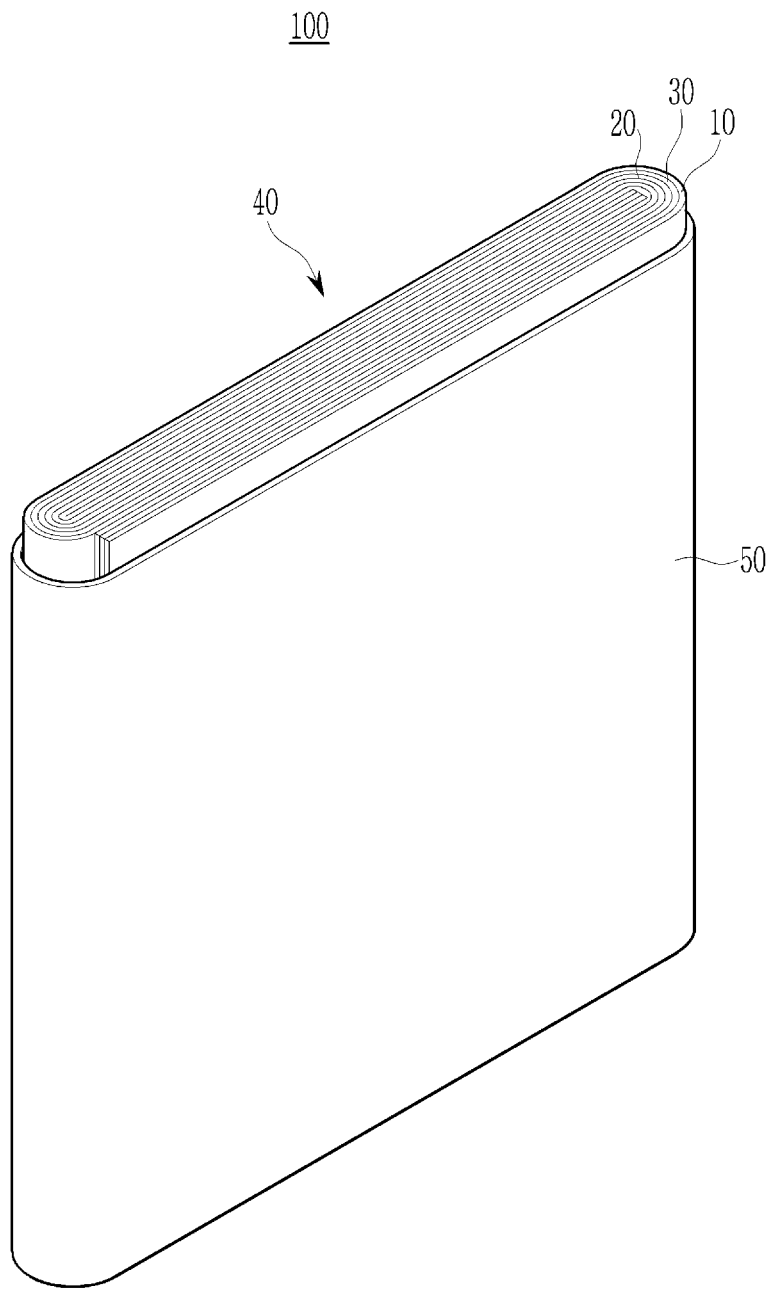

NEGATIVE ELECTRODE FOR RECHARGEABLE LITHIUM BATTERY AND RECHARGEABLE LITHIUM BATTERY INCLUDING SAME

CROSS-REFERENCE TO RELATED APPLICATION

Korean Patent Application No. 10-2019-0065538, filed on Jun. 3, 2019, in the Korean Intellectual Property Office, and entitled: "Negative Electrode for Rechargeable Lithium Battery and Rechargeable Lithium Battery Including Same," is incorporated by reference herein in its entirety.

BACKGROUND OF THE INVENTION

1. Field

Embodiments relate to a negative electrode for a rechargeable lithium battery and a rechargeable lithium battery including the same.

2. Description of the Related Art

Technology development for realizing high capacity of a rechargeable lithium battery has been continuously made due to an increasing demand on a mobile equipment or a portable battery.

As for electrolytes of a rechargeable lithium battery, an organic solvent in which a lithium salt is dissolved may be used. As for a positive active material of a rechargeable lithium battery, a lithium-transition metal oxide having a structure capable of intercalating lithium ions such as $LiCoO_2$, $LiMn_2O_4$, $LiNi_{1-x}Co_xO_2$ (0<x<1), or the like may be used.

As for a negative active material, silicon (e.g., silicon-containing) active materials including Si (e.g., Si and Sn), or various carbon (e.g., carbon-containing) materials including artificial graphite, natural graphite, and hard carbon capable of intercalating and deintercalating lithium ions may be used.

SUMMARY

The embodiments may be realized by providing a negative electrode for a rechargeable lithium battery, the negative electrode including a negative active material layer including a silicon (Si)-containing negative active material, and a binder, wherein the binder includes a copolymer including an amide group-containing first repeating unit, a cyano group-containing second repeating unit, and a sulfonate group-containing third repeating unit.

The first repeating unit may be represented by Chemical Formula 1:

[Chemical Formula 1]

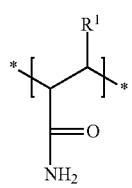

wherein, in Chemical Formula 1, $R^1$ may be hydrogen or a substituted or unsubstituted alkyl group.

The second repeating unit may be represented by Chemical Formula 2:

[Chemical Formula 2]

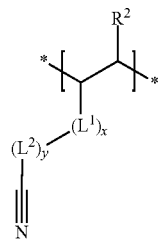

wherein, in Chemical Formula 2, $R^2$ may be hydrogen or a substituted or unsubstituted alkyl group, $L^1$ may be —C(=O)—, —C(=O)O—, —OC(=O)—, —O—, or —C(=O)NH—, x may be an integer of 0 to 2, $L^2$ may be a substituted or unsubstituted alkylene group, a substituted or unsubstituted cycloalkylene group, a substituted or unsubstituted arylene group, or a substituted or unsubstituted heterocyclic group, and y may be an integer of 0 to 2.

The third repeating unit may be represented by Chemical Formula 3 or Chemical Formula 4:

[Chemical Formula 3]

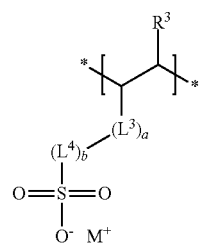

[Chemical Formula 4]

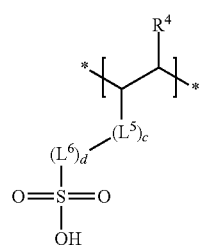

wherein, in Chemical Formulae 3 and 4, $R^3$ and $R^4$ may be independently hydrogen or a substituted or unsubstituted alkyl group, $L^3$ and $L^5$ may be independently —C(=O)—, —C(=O)O—, —OC(=O)—, —O—, or —C(=O)NH—, $L^4$ and $L^6$ may be independently a substituted or unsubstituted alkylene group, a substituted or unsubstituted cycloalkylene group, a substituted or unsubstituted arylene group, or a substituted or unsubstituted heterocyclic group, a, b, c, and d may be independently an integer of 0 to 2, and M may be an alkali metal.

The copolymer may include about 49.9 mol % to about 95 mol % of the first repeating unit, about 5 mol % to about 50 mol % of the second repeating unit, and about 0.1 mol % to about 20 mol % of the third repeating unit.

A weight average molecular weight (Mw) of the copolymer may be about 200,000 to about 700,000.

A glass transition temperature of the copolymer may be about 130° C. to about 160° C.

The copolymer may be included in the negative active material layer in an amount of about 3 wt % to about 20 wt %, based on 100 wt % of the negative active material layer.

The Si-containing negative active material may include Si, $SiO_x$, in which $0<x<2$, a Si-Q alloy, in which Q is an alkali metal, an alkaline-earth metal, a Group 13 element, a Group 14 element, a Group 15 element, a Group 16 element, a transition metal, a rare earth element, or a combination thereof, but not Si, a Si-carbon composite, or a combination thereof.

A thickness of the negative electrode may be about 30 μm to about 120 μm.

The embodiments may be realized by providing a rechargeable lithium battery including the negative electrode according to an embodiment; a positive electrode including a positive active material; and a non-aqueous electrolyte.

BRIEF DESCRIPTION OF THE DRAWING

Features will be apparent to those of skill in the art by describing in detail exemplary embodiments with reference to the attached drawing in which:

The FIGURE is an exploded perspective view of a rechargeable lithium battery according to one embodiment.

DETAILED DESCRIPTION

Example embodiments will now be described more fully hereinafter with reference to the accompanying drawing; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing FIGURE, the dimensions of layers and regions may be exaggerated for clarity of illustration. It will also be understood that when a layer or element is referred to as being "on" another layer or element, it can be directly on the other layer or element, or intervening layers may also be present. In addition, it will also be understood that when a layer is referred to as being "between" two layers, it can be the only layer between the two layers, or one or more intervening layers may also be present. Like reference numerals refer to like elements throughout.

The negative electrode for a rechargeable lithium battery according to an embodiment may include a negative active material layer including a Si negative electrode material and a binder.

In an implementation, the binder may include a copolymer (e.g., an acryl copolymer) including an amide group-containing first repeating unit (e.g., a first repeating unit derived from (meth)acrylamide or including a (meth)acrylamide group), a cyano group-containing second repeating unit, and a sulfonate group-containing third repeating unit. In an implementation, the binder may be a terpolymer including the first repeating unit, the second repeating unit, and the third repeating unit, e.g., repeating units of the three monomers.

As used herein, when a definition is not otherwise provided, 'substituted' refers to substitution of hydrogen of a compound by a substituent selected from a halogen atom (F, Br, Cl or I), a hydroxy group, an alkoxy group, a nitro group, a cyano group, an amino group, an azido group, an amidino group, a hydrazino group, a hydrazono group, a carbonyl group, a carbamyl group, a thiol group, an ester group, a carboxyl group or a salt thereof, a sulfonic acid group or a salt thereof, a phosphoric acid or a salt thereof, a C1 to C20 alkyl group, a C2 to C20 alkenyl group, a C2 to C20 alkynyl group, a C6 to C30 aryl group, a C7 to C30 arylalkyl group, a C1 to C4 alkoxy group, a C1 to C20 heteroalkyl group, a C3 to C20 heteroarylalkyl group, a C3 to C30 cycloalkyl group, a C3 to C15 cycloalkenyl group, a C6 to C15 cycloalkynyl group, a C2 to C20 heterocycloalkyl group, or a combination thereof.

In addition, as used herein, when a definition is not otherwise provided, 'hetero' refers to one including 1 to 3 heteroatoms selected from N, O, S, and P.

In addition, as used herein, when a definition is not otherwise provided, 'heterocyclic group' refers to a substituted or unsubstituted C3 to C20 heterocycloalkylene group or a substituted or unsubstituted C6 to C20 heteroarylene group.

In an implementation, the amide group-containing first repeating unit may be represented by Chemical Formula 1. In an implementation, the amide group-containing first repeating unit may include a derivative of a (meth)acrylamide, which may refer to, e.g., acrylamide or methacrylamide.

[Chemical Formula 1]

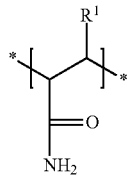

In Chemical Formula 1, $R^1$ may be, e.g., hydrogen or a substituted or unsubstituted alkyl group. In an implementation, the alkyl group may be, e.g., a C1 to C3 alkyl group, and may be a linear or branched alkyl group (e.g., the C3 alkyl group may be branched). In an implementation, the alkyl group may be, e.g., a methyl group.

The cyano group-containing second repeating unit may be represented by Chemical Formula 2.

[Chemical Formula 2]

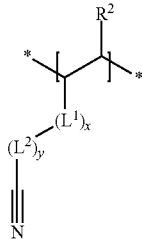

In Chemical Formula 2, $R^2$ may be, e.g., hydrogen or a substituted or unsubstituted alkyl group, $L^1$ may be, e.g., —C(=O)—, —C(=O)O—, —OC(=O)—, —O—, or —C(=O)NH—, x may be, e.g., an integer of 0 to 2, $L^2$ may be, e.g., a substituted or unsubstituted alkylene group, a substituted or unsubstituted cycloalkylene group, a substituted or unsubstituted arylene group, or a substituted or unsubstituted heterocyclic group, and y may be, e.g., an integer of 0 to 2.

In an implementation, in Chemical Formula 2, the alkyl group may be, e.g., a C1 to C3 alkyl group, the alkylene group may be, e.g., a C1 to C10 alkylene group, the cycloalkylene group may be, e.g., a C3 to C20 cycloalkylene group, the arylene group may be, e.g., a C6 to C20 arylene group, and the heterocyclic group may be, e.g., a C3 to C20 heterocyclic group. In an implementation, the heterocyclic group may be, e.g., a hetetocycloalkylene group. In an implementation, the hetetocycloalkylene group may be, e.g., a C3 to C20 heterocycloalkylene group.

The sulfonate group-containing third repeating unit may be represented by one of Chemical Formula 3 or Chemical Formula 4.

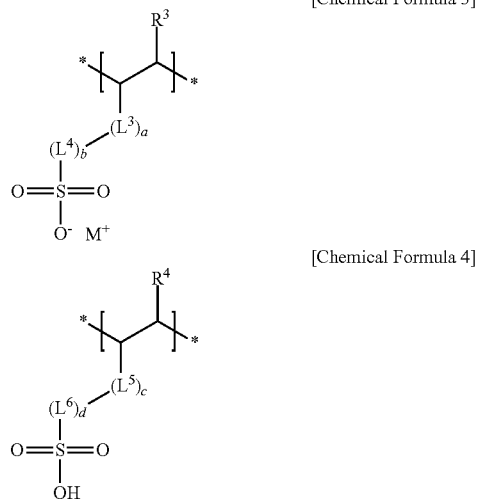

[Chemical Formula 3]

[Chemical Formula 4]

In Chemical Formulae 3 and 4,
$R^3$ and $R^4$ may each independently be, e.g., hydrogen or a substituted or unsubstituted alkyl group,
$L^3$ and $L^5$ may each independently be, e.g., —C(=O)—, —C(=O)O—, —OC(=O)—, —O—, or —C(=O)NH—, and
$L^4$ and $L^6$ may each independently be, e.g., a substituted or unsubstituted alkylene group, a substituted or unsubstituted cycloalkylene group, a substituted or unsubstituted arylene group, or a substituted or unsubstituted heterocyclic group. In an implementation, in Chemical Formulae 3 and 4, the alkyl group may be, e.g., a C1 to C3 alkyl group, the alkylene group may be, e.g., a C1 to C10 alkylene group, the cycloalkylene group may be, e.g., a C3 to C20 cycloalkylene group, the arylene group may be, e.g., a C6 to C20 arylene group, and the heterocyclic group may be, e.g., a C3 to C20 heterocyclic group. In an implementation, the heterocyclic group may be, e.g., a hetetocycloalkylene group. In an implementation, the hetetocycloalkylene group may be, e.g., a C3 to C20 heterocycloalkylene group.

In Chemical Formulae 3 and 4, a, b, c, and d may each independently be, e.g., an integer of 0 to 2, and M may be, e.g., an alkali metal. In an implementation, M may be, e.g., Na, Li or K.

In an implementation, the first repeating unit may be included in the copolymer in an amount of about 49.9 mol % to about 90 mol %, e.g., about 60 mol % to about 80 mol %. When the first repeating unit is included within the range, rigidity of the polymer may be increased, thereby exhibiting an improved expansion inhibiting effect. In the copolymer, when the amount of the first repeating unit is included in the above range, the expansion inhibiting effect may be further increased, thereby further improving cycle-life characteristics. Maintaining the amount of the first repeating unit within the above range, e.g., about 49.9 mol % to about 90 mol %, may help prevent the generation of cracks in the negative electrode, may help prevent a reduction in phase stability, and may help prevent a degradation of an expansion inhibiting effect.

In an implementation, the second repeating unit may be included in the copolymer in an amount of about 5 mol % to about 50 mol %, e.g., about 10 mol % to about 30 mol %. In the copolymer, when the amount of the second repeating unit is included within the above range, adhesion to the current collector may be further improved, thereby effectively suppressing detachment of the active material layer from the current collector during charging and discharging, which is desirable in terms of cycle-life characteristics. Maintaining the amount of the second repeating unit within the above range, e.g., at about 5 mol % or greater may help prevent detaching of the active material layer during production of the negative electrode, thereby facilitating manufacturing of a battery. Maintaining the amount of the second repeating unit at about 50 mol % or less may help prevent a reduction in the dispersibility of the active material, thereby avoiding problems in the coating process.

In an implementation, the third repeating unit may be included in the copolymer in an amount of about 0.1 mol % to about 20 mol %, e.g., about 5 mol % to about 20 mol %. When the third repeating unit is included within the above range, dispersibility may be further improved, and lithium ion movement may be faster. Maintaining the amount of the third repeating unit at about 0.1 mol % or greater may help prevent a reduction in dispersibility. Maintaining the amount of the third repeating unit at about 20 mol % or less may help prevent a reduction in adhesion and binding force, thereby preventing a decrease in a cycle-life, and preventing the active material layer from being detached during battery manufacturing.

The binder according to the embodiment is a binder including the first repeating unit, the second repeating unit, and the third repeating unit, and when such a binder is used for the negative electrode, it is possible to effectively suppress expansion of the negative active material. This effect may be obtained by including all of the first repeating unit, the second repeating unit, and the third repeating unit. If the third repeating unit were to be omitted, the binder may not be dispersed well in the negative electrode, and thus an appropriate effect as a binder may not be exhibited. If the second repeating unit were to be omitted, the effect of suppressing expansion during charging and discharging may be insignificant, and adhesion of the electrode may be lowered. If the first repeating unit were to be omitted, an effect of effectively suppressing expansion may not be obtained. In addition, if a binder including only the first repeating unit alone were to be used, the manufactured negative electrode may be brittle, which is not suitable.

In an implementation, a weight average molecular weight (Mw) of the copolymer may be about 200,000 to about 700,000, e.g., about 450,000 to about 650,000. When the weight average molecular weight of the copolymer is within the above range, the negative active material layer may be appropriately formed. Maintaining the weight average molecular weight (Mw) of the copolymer at about 200,000 or greater may help ensure that desired performance is obtained. Maintaining the weight average molecular weight (Mw) of the copolymer at about 700,000 or less may help prevent a reduction in processability of forming the negative active material layer.

In an implementation, a glass transition temperature (Tg) of the copolymer may be about 130° C. to about 160° C. When the glass transition temperature of the copolymer is within the above range, the negative active material layer may be appropriately formed.

In an implementation, the copolymer may be included in the negative active material layer (as the binder) in an amount of about 3 wt % to about 20 wt %, e.g., about 3.0 wt % to about 10 wt % based on a total weight, 100 wt %, of the negative active material layer. When the amount of the copolymer is within the above range, while maintaining the cycle-life characteristics well, a volume expansion of the negative electrode due to charging and discharging may be suppressed more effectively.

The copolymer binder including the first repeating unit, the second repeating unit, and the third repeating unit may exhibit excellent cohesion, and may have an excellent effect of suppressing a volume expansion of the negative electrode during charging and discharging. Compared with a styrene-butadiene rubber binder used for the binder of some other negative electrodes, the effect of suppressing a volume expansion by using the copolymer according to an embodiment may be very good. In addition, the copolymer binder may help improve cycle-life characteristics by suppressing the conductive path breakage.

The effect of improving the volume expansion inhibition and cycle-life characteristics of the negative electrode by using the copolymer including the first repeating unit, the second repeating unit, and the third repeating unit as the binder of the negative electrode may be obtained very effectively when a silicon active material (e.g., Si-based or Si-containing active material) is used as an active material. If a carbon active material were to be used as the negative active material instead of the Si active material, the carbon active material may not need to use the copolymer according to this embodiment, since the volume expansion is minimal during charging and discharging. Thus, when the copolymer including the first repeating unit, the second repeating unit, and the third repeating unit is used as the binder of the negative electrode, a Si active material (that has improved efficiency and rate characteristics, and causes volume expansion severely during charge and discharge) may be usefully used in a battery, and thus a higher capacity/high energy density battery may be provided.

In the negative electrode according to an embodiment, the negative active material may be a Si negative active material. In an implementation, the Si negative active material may include, e.g., Si, $SiO_x$ (0<x<2), a Si-Q alloy (in which Q is, e.g., an alkali metal, an alkaline-earth metal, a Group 13 element, a Group 14 element, a Group 15 element, a Group 16 element, a transition metal, a rare earth element, and a combination thereof, but not Si), a Si-carbon composite or a combination thereof.

The Si-carbon composite may be a Si-carbon composite including a core including crystalline carbon and silicon particles and an amorphous carbon coating layer disposed on the surface of the core. The crystalline carbon may be artificial graphite, natural graphite, or a combination thereof. The amorphous carbon may be prepared using coal-based pitch, mesophase pitch, mesophase pitch, petroleum-based pitch, coal-based oil, petroleum-based heavy oil or a polymer resin such as a phenol resin, a furan resin, a polyimide resin, as an amorphous carbon precursor. Examples of the amorphous carbon include soft carbon or hard carbon. In an implementation, an amount of silicon may be about 10 wt % to about 70 wt % based on a total weight of the silicon-carbon composite. In an implementation, an amount of the crystalline carbon may be about 10 wt % to about 70 wt % based on a total weight of the Si-carbon composite, an amount of amorphous carbon may be about 20 wt % to about 40 wt % based on a total weight of the silicon-carbon composite. In an implementation, the amorphous carbon coating layer may have a thickness of about 5 nm to about 100 nm. The average particle diameter (D50) of the silicon particles may be about 10 nm to about 1 μm. In an implementation, the average particle diameter (D50) of the silicon particles may be, e.g., about 10 nm to about 200 nm. The silicon particles may be present in an oxidized form, where the atomic amount ratio of Si:O in the silicon particles indicating a degree of oxidation may be a weight ratio of about 99:1 to about 33:66. The silicon particles may be $SiO_x$ particles wherein the x range in $SiO_x$ may be greater than 0 and less than 2. As used herein, unless otherwise defined, the average particle diameter (D50) refers to a diameter of particles having a cumulative volume of 50% by volume in the particle size distribution.

An amount of the negative active material may be about 80 wt % to about 97.0 wt %, based on a total weight of the negative active material and the binder.

The negative active material layer may further include a conductive material. When the conductive material is further included, an amount of the negative active material in the negative active material layer may be about 70 wt % to about 96 wt %, an amount of the copolymer binder may be about 3 wt % to about 20 wt %, and an amount of the conductive material may be about 1 wt % to about 10 wt %.

The conductive material may be included to provide electrode conductivity and a suitable electrically conductive material that does not cause a chemical change may be used as a conductive material. Examples of the conductive material may include a carbon material such as natural graphite, artificial graphite, carbon black, acetylene black, Ketjen black, Denka black, a carbon fiber, and the like; a metal material of a metal powder or a metal fiber including copper, nickel, aluminum silver, and the like; a conductive polymer such as a polyphenylene derivative; or a mixture thereof.

The negative electrode may further include a current collector for supporting the negative active material layer.

In an implementation, the current collector may include a copper foil, a nickel foil, a stainless steel foil, a titanium foil, a nickel foam, a copper foam, a polymer substrate coated with a conductive metal, or a combination thereof.

The negative active material layer may have a thickness of about 30 μm to about 120 μm.

When the thickness of the negative electrode is within the above range, rate capability and cycle-life characteristics may be further improved.

The negative electrode may be formed by mixing the negative active material, the binder, and optionally the conductive material in a solvent to prepare a negative active material composition, and coating the negative active material composition on a current collector followed by drying and compressing the same. The solvent may be a water or aqueous solvent.

Another embodiment provides a rechargeable lithium battery including the negative electrode, a positive electrode including a positive active material, and a non-aqueous electrolyte.

The positive electrode may include a current collector and a positive active material layer formed on the current collector and including a positive active material.

The positive active material may be a compound (lithiated intercalation compound) capable of intercalating and deintercalating lithium, e.g., composite oxides of a metal selected from cobalt, manganese, nickel, and a combination thereof, and lithium. Other examples may be compounds represented by one of the following chemical formulae. $Li_aA_{1-b}X_bD_2$ (0.90≤a≤1.8, 0≤b≤0.5); $Li_aA_{1-b}X_bO_2$, $D_c$ (0.90≤a≤1.8, 0≤b≤0.5, 0≤c≤0.05); $Li_aE_{1-b}X_bO_{2-c}D_c$ (0.90≤a≤1.8, 0≤b≤0.5, 0≤c≤0.05); $Li_aE_{2-b}X_bO_{4-c}D_c$ (0.90≤a≤1.8, 0≤b≤0.5, 0≤c≤0.05); $Li_aNi_{1-b-c}Co_bX_cD_\alpha$, (0.90≤a≤1.8, 0≤b≤0.5, 0≤c≤0.5, 0≤α≤2); $Li_a Ni_{1-b-c}Co_bX_cD_\alpha$ (0.90≤a≤1.8, 0≤b≤0.5, 0≤c≤0.05, 0≤α<2); $Li_aNi_{1-b-c}Co_bX_cO_{2-\alpha}T_2$ (0.90≤a≤1.8, 0≤b≤0.5, 0≤c≤0.05, 0≤α<2); $Li_aNi_{1-b-c}Mn_bX_cD'_\alpha$ (0.90≤a≤1.8, 0≤b≤0.5, 0≤c≤0.05, 0≤α≤2); $Li_aNi_{1-b-c}Mn_bX_cO_{2-\alpha}T_\alpha$ (0.90≤a≤1.8, 0≤b≤0.5, 0≤c≤0.05, 0≤α≤2); $Li_aNi_{1-b-c}Mn_bX_cO_{2-\alpha}T_2$ (0.90≤a≤1.8, 0≤b≤0.5, 0≤c≤0.05, 0≤α≤2); $Li_aNi_bE_cG_dO_2$ (0.90≤a≤1.8, 0≤b≤0.9, 0≤c≤0.5, 0.001≤d≤0.1); $Li_aNi_bCo_cMn_dG_eO_2$ (0.90≤a≤1.8, 0≤b≤0.9, 0≤c≤0.5, 0≤d≤0.5, 0.001≤e≤0.1); $Li_aNiG_bO_2$ (0.90≤a≤1.8, 0.001≤b≤0.1) $Li_aCoG_bO_2$ (0.90≤a≤1.8, 0.001≤b≤0.1); $Li_aMn_{1-b}G_bO_2$ (0.90≤a≤1.8, 0.001≤b≤0.1); $Li_aMn_2G_bO_4$ (0.90≤a≤1.8, 0.001≤b≤0.1); $Li_aMn_{1-g}G_gPO_4$ (0.90≤a≤1.8, 0≤g≤0.5); $QO_2$; $QS_2$; $LiQS_2$; $V_2O_5$; $LiV_2O_5$; $LiZO_2$; $LiNiVO_4$; $Li_{(3-f)}J_2(PO_4)_3$ (0≤f≤2); $Li_{(3-f)}Fe_2(PO_4)_3$ (0≤f≤2); or $Li_aFePO_4$ (0.90≤a≤1.8)

In the chemical formulae, A may be selected from Ni, Co, Mn, or a combination thereof; X may be selected from Al, Ni, Co, Mn, Cr, Fe, Mg, Sr, V, a rare earth element, or a combination thereof; D' may be selected from O, F, S, P, or a combination thereof; E is selected from Co, Mn, or a combination thereof; T may be selected from F, S, P, or a combination thereof; G may be selected from Al, Cr, Mn, Fe, Mg, La, Ce, Sr, V, or a combination thereof; Q may be selected from Ti, Mo, Mn, or a combination thereof; Z may be selected from Cr, V, Fe, Sc, Y, or a combination thereof; and J may be selected from V, Cr, Mn, Co, Ni, Cu, or a combination thereof.

The compounds may have a coating layer on the surface, or may be mixed with another compound having a coating layer. The coating layer may include at least one coating element compound, e.g., an oxide of a coating element, a hydroxide of a coating element, an oxyhydroxide of a coating element, an oxycarbonate of a coating element, or a hydroxyl carbonate of a coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be disposed in a method having no adverse influence on properties of a positive active material by using these elements in the compound. In an implementation, the method may include any coating method such as spray coating, dipping, or the like.

In the positive electrode, an amount of the positive active material may be about 90 wt % to about 98 wt %, based on a total weight of the positive active material layer.

In an implementation, the positive active material layer may further include a binder and a conductive material. Herein, each amount of the binder and the conductive material may be about 1 wt % to about 5 wt % based on the total weight of the positive active material layer.

The binder may help improve binding properties of positive active material particles with one another and with a current collector. Examples thereof may include polyvinyl alcohol, carboxymethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like.

The conductive material may be included to provide electrode conductivity and a suitable electrically conductive material that does not cause a chemical change may be used as a conductive material. Examples of the conductive material may include a carbon material such as natural graphite, artificial graphite, carbon black, acetylene black, Ketjen black, a carbon fiber, and the like; a metal material of a metal powder or a metal fiber including copper, nickel, aluminum, silver, and the like; a conductive polymer such as a polyphenylene derivative; or a mixture thereof.

The current collector may be, e.g., an aluminum foil, a nickel foil, or a combination thereof.

The positive electrode may be formed by mixing the positive active material, the binder, and the conductive material in a solvent to prepare a positive active material composition, and coating the positive active material composition on a current collector followed by drying and compressing the same. The solvent may include, e.g., an N-methyl pyrrolidone solvent.

The electrolyte may include, e.g., a non-aqueous organic solvent and a lithium salt.

The non-aqueous organic solvent serves as a medium for transmitting ions taking part in the electrochemical reaction of a battery.

The non-aqueous organic solvent may include, e.g., a carbonate solvent, an ester solvent, an ether solvent, a ketone solvent, an alcohol solvent, or an aprotic solvent.

The carbonate solvent may include, e.g., dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), or the like. The ester solvent may include, e.g., methyl acetate, ethyl acetate, n-propyl acetate, t-butyl acetate, methylpropionate, ethylpropionate, decanolide, mevalonolactone, caprolactone, or the like. The ether solvent may include, e.g., dibutyl ether, tetraglyme, diglyme, dimethoxyethane, 2-methyltetrahydrofuran, tetrahydrofuran, or the like. The ketone solvent may include, e.g., cyclohexanone or the like. The alcohol solvent may include, e.g., ethyl alcohol, isopropyl alcohol, or the like. The aprotic solvent may include, e.g., nitriles such as R—CN (where R is a C2 to C20 linear, branched, or cyclic hydrocarbon, or may include a double bond, an aromatic ring, or an ether bond), amides such as dimethylformamide, dioxolanes such as 1,3-dioxolane, sulfolanes, or the like.

The organic solvent may be used alone or in a mixture. When the organic solvent is used in a mixture, the mixture ratio may be controlled in accordance with a desirable battery performance.

When the non-aqueous organic solvent is used in a mixture, a mixed solvent of cyclic carbonate and chain carbonate; a mixed solvent of cyclic carbonate and a propionate solvent; or a mixed solvent of cyclic carbonate, chain carbonate, and a propionate solvent may be used. The propionate solvent may include, e.g., methyl propionate, ethyl propionate, propyl propionate, or a combination thereof.

Herein, when the cyclic carbonate and the chain carbonate or the cyclic carbonate and the propionate solvent are mixed, they may be mixed in a volume ratio of about 1:1 to about 1:9 and thus performance of an electrolyte solution may be improved. In addition, when the cyclic carbonate, the chain carbonate, and the propionate solvent are mixed, they may be mixed in a volume ratio of about 1:1:1 to about 3:3:4. The mixing ratios of the solvents may be appropriately adjusted according to desirable properties.

The organic solvent may further include an aromatic hydrocarbon organic solvent in addition to the carbonate solvent. Herein, the carbonate solvent and the aromatic hydrocarbon organic solvent may be mixed in a volume ratio of about 1:1 to about 30:1.

The aromatic hydrocarbon organic solvent may be an aromatic hydrocarbon compound of Chemical Formula 5.

[Chemical Formula 5]

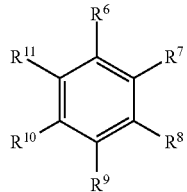

In Chemical Formula 5, $R^6$ to $R^{11}$ may each independently be, e.g., hydrogen, a halogen, a C1 to C10 alkyl group, a haloalkyl group, or a combination thereof.

Examples of the aromatic hydrocarbon organic solvent may include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte may further include an additive of vinylene carbonate or an ethylene carbonate compound of Chemical Formula 6 as an additive for improving a cycle-life.

[Chemical Formula 6]

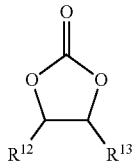

In Chemical Formula 6, $R^{12}$ and $R^{13}$ may each independently be, e.g., hydrogen, a halogen, a cyano group (CN), a nitro group ($NO_2$), or a fluorinated C1 to C5 alkyl group. In an implementation, at least one of $R^{12}$ and $R^{13}$ may be, e.g., a halogen, a cyano group (CN), a nitro group ($NO_2$), or a fluorinated C1 to C5 alkyl group, and $R^{12}$ and $R^{13}$ are not simultaneously hydrogen.

Examples of the ethylene carbonate compound may include difluoro ethylenecarbonate, chloroethylene carbonate, dichloroethylene carbonate, bromoethylene carbonate, dibromoethylene carbonate, nitroethylene carbonate, cyanoethylene carbonate, or fluoroethylene carbonate. The amount of the additive for improving a cycle-life may be used within an appropriate range.

The lithium salt dissolved in an organic solvent supplies a battery with lithium ions, facilitates basic operation of the rechargeable lithium battery, and improves transportation of the lithium ions between positive and negative electrodes. Examples of the lithium salt may include $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $Li(FSO_2)_2N$ (lithium bis(fluorosulfonyl)imide: LiFSI), $LiC_4F_9SO_3$, $LiClO_4$, $LiAlO_2$, $LiAlCl_4$, $LiN(C_xF_{2x+1}SO_2)(C_yF_{2y+1}SO_2)$, wherein, x and y are natural numbers, for example an integer ranging from 1 to 20, LiCl, LiI, and $LiB(C_2O_4)_2$ (lithium bis(oxalato) borate: LiBOB). A concentration of the lithium salt may range from about 0.1 M to about 2.0 M. When the lithium salt is included at the above concentration range, an electrolyte may have excellent performance and lithium ion mobility due to optimal electrolyte conductivity and viscosity.

The rechargeable lithium battery may further include a separator between the negative electrode and the positive electrode, depending on a kind of the battery. Examples of a suitable separator material include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

The FIGURE is an exploded perspective view of a rechargeable lithium battery according to one embodiment. In an implementation, as illustrated in the FIGURE, the rechargeable lithium battery may be a prismatic battery. In an implementation, the battery may include variously-shaped batteries such as a cylindrical battery, a pouch battery, or the like.

Referring to the FIGURE, a rechargeable lithium battery 100 according to an embodiment may include an electrode assembly 40 manufactured by winding a separator 30 interposed between a positive electrode 10 and a negative electrode 20, and a case 50 housing the electrode assembly 40. An electrolyte may be impregnated in the positive electrode 10, the negative electrode 20, and the separator 30.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Example 1

Distilled water, acrylamide (8.5 mol), potassium persulfate (0.01 mol), 2-acrylamido-2-methylpropanesulfonic acid (1.0 mol), and a 5 N lithium hydroxide aqueous solution (1.05 equivalents based on a total amount of the 2-acrylamido-2-methylpropanesulfonic acid) were put in a 10 L four-necked flask equipped with an agitator, a thermometer, and a cooling tube, and after nitrogen was flowed thereinto under an internal pressure (10 mmHg), acrylonitrile (0.5 mol) was added thereto.

Subsequently, while a temperature of the obtained reaction solution was controlled at 60° C., the reaction solution was reacted for 12 hours and then, cooled down to ambient temperature.

Through the reaction, a poly(acrylamide-co-acrylonitrile-co-2-acrylamido-2-methylpropanesulfonate) lithium salt binder was prepared.

In the prepared copolymer binder, acrylamide as a first repeating unit, acrylonitrile as a second repeating unit, and lithium 2-acrylamido-2-methylpropanesulfonate (2-acrylamido-2-methylpropanesulfonic acid lithium salt) as a third repeating unit, respectively had structures of Chemical Formulae 1, 2, and 3, and a mole ratio (mol %) of the first, second, and third repeating units was of 85:5:10.

[Chemical Formula 1]

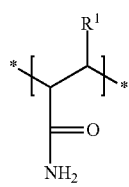

In Chemical Formula 1, $R^1$ was hydrogen.

[Chemical Formula 2]

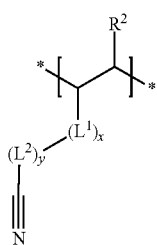

In Chemical Formula 2, $R^2$ was hydrogen,
x was 0, and
y was 0.

[Chemical Formula 3]

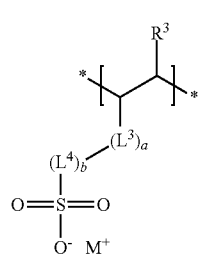

In Chemical Formula 3,
$R^3$ was hydrogen,
$L^3$ was C(=O)NH and a was 1,
$L^4$ was a C2 ethylene group substituted with two methyl groups, e.g., $C(CH_3)_2CH_2$ and b was 1, and
M was Li.

The prepared copolymer binder was mixed with a Si-carbon composite active material in a weight ratio of 5:95 in a water solvent to prepare negative active material slurry, and the negative active material slurry was coated to be 60 μm thick in a copper foil and then, compressed and dried to manufacture a negative electrode having a 55 μm-thick negative active material layer.

The Si-carbon composite included a core including natural graphite crystalline carbon and silicon particles and a soft carbon/hard carbon amorphous carbon coating layer on the core surface. An amount of the crystalline carbon was 40 wt % based on a total weight of the Si-carbon composite, and an amount of the amorphous carbon was 20 wt %. A thickness of the amorphous carbon coating layer was in a range of about 20 nm to 30 nm, and the silicon particles had an average particle diameter (D50) of 100 nm.

Example 2

A negative electrode was manufactured according to the same method as Example 1 except that acrylamide (8.0 mol), 2-acrylamido-2-methylpropanesulfonic acid (1.0 mol), and acrylonitrile (1.0 mol) were used to prepare a copolymer binder including acrylamide as a first repeating unit, acrylonitrile as a second repeating unit, and lithium 2-acrylamido-2-methylpropanesulfonate as a third repeating unit in a mole ratio (mol %) of 80:10:10.

Example 3

A negative electrode was manufactured according to the same method as Example 1 except that acrylamide (7.0 mol), 2-acrylamido-2-methylpropanesulfonic acid (1.0 mol), and acrylonitrile (2.0 mol) were used to prepare a copolymer binder including acrylamide as a first repeating unit, acrylonitrile as a second repeating unit, and lithium 2-acrylamido-2-methylpropanesulfonate as a third repeating unit in a mole ratio (mol %) of 70:20:10.

Example 4

A negative electrode was manufactured according to the same method as Example 1 except that acrylamide (5.0 mol), 2-acrylamido-2-methylpropanesulfonic acid (1.0 mol), and acrylonitrile (4.0 mol) were used to prepare a copolymer binder including acrylamide as a first repeating unit, acrylonitrile as a second repeating unit, and lithium 2-acrylamido-2-methylpropanesulfonate as a third repeating unit in a mole ratio (mol %) of 50:40:10.

Comparative Example 1

A negative electrode was manufactured according to the same method as Example 1 except that acrylamide (9.0 mol) and 2-acrylamido-2-methylpropanesulfonic acid (1.0 mol) were used to prepare a copolymer binder including acrylamide as a first repeating unit and lithium 2-acrylamido-2-methylpropanesulfonate as a third repeating unit in a mole ratio (mol %) of 90:10.

Comparative Example 2

A negative electrode was manufactured according to the same method as Comparative Example 1 except that acrylamide (8.0 mol) and 2-acrylamido-2-methylpropanesulfonic acid (2.0 mol) were used to prepare a copolymer binder including acrylamide as a first repeating unit and lithium 2-acrylamido-2-methylpropanesulfonate as a third repeating unit in a mole ratio (mol %) of 80:20.

Comparative Example 3

A negative electrode was manufactured according to the same method as Comparative Example 1 except that acrylamide (6.0 mol) and 2-acrylamido-2-methylpropanesulfonic acid (4.0 mol) were used to prepare a copolymer binder including acrylamide as a first repeating unit and lithium 2-acrylamido-2-methylpropanesulfonate as a third repeating unit in a mole ratio (mol %) of 60:40.

Comparative Example 4

97 wt % of a graphite/silicon-mixed active material, 1.5 wt % of a styrene-butadiene rubber binder, and 1.5 wt % of a carboxymethyl cellulose thickener were mixed in a water solvent to prepare negative active material slurry, and the negative active material slurry was coated to be 60 μm thick on a copper foil and then, compressed and dried to manufacture a 55 μm-thick negative electrode.

Manufacture of Battery Cell

Each negative electrode according to Examples 1 to 4 and Comparative Example 1 to 4, a positive electrode, and a non-aqueous electrolyte were used to manufacture a pouch-type battery cell having theoretical capacity (nominal capacity) of 100 mAh in a common process. The non-aqueous electrolyte was prepared by using a mixed solvent of ethylene carbonate and ethylene propionate (a volume ratio of 3:7) and dissolving $LiPF_6$ therein in an amount sufficient to prepare a 1.3 M solution.

The positive electrode was manufactured by mixing 97 wt % of a $LiCoO_2$ positive active material, 1.5 wt % of a polyvinylidene fluoride binder, and 1.5 wt % of a carbon black conductive material in an N-methylpyrrolidone solvent to prepare a positive active material slurry composition and coating the positive active material composition on Al foil, drying, and compressing.

Swelling Characteristic Evaluation

The pouch-type battery cells were respectively 25 times charged and discharged at 1 C. A battery thickness before the charges and discharges and a battery thickness at each charge and discharge cycle were measured in real time, and then, the thickness at the $25^{th}$ charge and discharge relative to 100% of the thickness before the charges and discharges was calculated to obtain a battery thickness increase rate %. The results are shown in Table 2.

Charge and Discharge Characteristics and Cycle-Life Characteristics

The manufactured pouch-type battery cells were once charged and discharged at 0.1 C, and then, charge and discharge capacity thereof were measured. A ratio of discharge capacity relative to the obtained charge capacity was calculated, and the results are shown as efficiency in Table 2.

The manufactured pouch-type battery cells were 40 times charged and discharged at 1 C at 45° C., and a ratio of the $25^{th}$ discharge capacity relative to the $1^{st}$ discharge capacity and a ratio of the $40^{th}$ discharge capacity relative to the $1^{st}$ discharge capacity were respectively calculated, and the cycle-life results are shown the following Table 2.

Adhesion Force Evaluation

The negative electrodes according to Examples 1 to 4 and Comparative Examples 1 to 4 were measured with respect to peel strength and thus evaluate an adhesion force, and the results are shown in Table 2.

The peel strength was measured by fixing each negative electrode on a stainless steel plate with a 1.5 cm-wide adhesive tape (Celotape No. 405, Nichiban Co., Ltd.).

And, a peeling tester (Shimazu EZ-S, Shimadzu Corp.) was used to measure the peel strength by a 180° peeling test.

Repeating unit mole ratios of the copolymer binders according to Examples 1 to 4 and Comparative Examples 1 to 3 are shown in Table 1. The binder of Comparative Example 4 was a styrene-butadiene rubber binder and thus not shown in Table 1.

In addition, properties of the copolymers, e.g., a glass transition temperature and a weight average molecular weight, are shown in Table 1.

TABLE 1

| | Repeating unit (mol %) | | | Glass transition temperature (Tg. ° C.) | Weight average molecular weight (×10⁵) |
|---|---|---|---|---|---|
| | First repeating unit (AM) | Third repeating unit (AMPS) | Second repeating unit (AN) | | |
| Example 1 | 85 | 10 | 5 | 149 | 5.5 |
| Example 2 | 80 | 10 | 10 | 144 | 5.1 |
| Example 3 | 70 | 10 | 20 | 137 | 4.9 |
| Example 4 | 50 | 10 | 40 | 131 | 4.6 |
| Comparative Example 1 | 90 | 10 | — | 150 | 5.6 |
| Comparative Example 2 | 80 | 20 | — | 145 | 5.7 |
| Comparative Example 3 | 60 | 40 | — | 132 | 7.2 |

TABLE 2

| | Thickness increase rate (%, at 25th) | Efficiency (%) | Cycle-life characteristics (25th, 45° C., %) | Cycle-life characteristics (40th, 45° C., %) | Adhesion force of electrode (gf/mm) |
|---|---|---|---|---|---|
| Example 1 | 9.2 | 84.3 | 93 | 90.9 | 1.2 |
| Example 2 | 8.5 | 84.9 | 93.5 | 91.5 | 1.3 |
| Example 3 | 8.1 | 85.6 | 93.7 | 92.3 | 1.5 |
| Example 4 | 8.9 | 86.1 | 93.4 | 91.2 | 1.6 |
| Comparative Example 1 | 10.1 | 84.1 | 93.6 | 91.1 | 0.8 |
| Comparative Example 2 | 10.3 | 84.5 | 93.3 | 90.8 | 1.7 |
| Comparative Example 3 | 10.6 | 85.3 | 93.1 | 90.5 | 0.4 |
| Comparative Example 4 | 11.9 | 85.1 | 90.7 | 87.6 | 1.1 |

As shown in Table 2, the battery cells using the negative electrodes of Examples 1 to 4 (all including the copolymer binder including the first repeating unit, the second repeating unit, and the third repeating unit) appropriately maintained charge and discharge efficiency and high temperature cycle-life characteristics and in addition, a low thickness increase rate and an excellent electrode adhesion force, compared with the battery cells according to Comparative Examples 1 and 3 (including a binder that only included the first repeating unit and the third repeating unit).

In addition, the battery cells using the negative electrodes of Examples 1 to 4 exhibited a lower thickness increase rate than the battery cell of Comparative Example 2. The battery cell of Comparative Example 2 exhibited excellent efficiency, cycle-life characteristics and electrode adhesion force, but too high a thickness increase rate (10.3%) and thus deteriorated safety.

In addition, the pouch-type battery cells using the negative electrodes of Examples 1 to 4 after the 45 charges and discharges exhibited excellent high temperature cycle-life characteristics compared with the half-cells of Comparative Examples 1 to 3 (including a binder that only included the first repeating unit and the third repeating unit).

In addition, the pouch-type battery cell using the negative electrode including a styrene-butadiene rubber as a binder according to Comparative Example 4 exhibited excellent charge and discharge efficiency and adhesion force, but a high thickness increase rate and deteriorated high temperature cycle-life characteristics.

Referring to these results, in order to suppress a volume expansion of the negative electrode using a silicon-containing negative active material having high capacity, the copolymer binder all including the first, second, and third repeating units may be used.

By way of summation and review, as high capacity batteries are used, a Si negative active material having a high capacity for high energy density has attracted attention. The Si negative active material may have a volume expansion ratio of about 300%, which is theoretically very high due to an electrochemical reaction of lithium, and it may be difficult to ensure long cycle-life.

One or more embodiments may provide a negative electrode for a rechargeable lithium battery that is effectively capable of suppressing expansion caused by charging and discharging, and that exhibits improved cycle-life characteristics.

One or more embodiments may provide a rechargeable lithium battery including the negative electrode.

The negative electrode for a rechargeable lithium battery according to an embodiment may exhibit improved cycle-life characteristics and swelling characteristics.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A negative electrode for a rechargeable lithium battery, the negative electrode comprising:
   a negative active material layer including a silicon (Si)-containing negative active material, and
   a binder,
   wherein:
   the binder includes a copolymer including an amide group-containing first repeating unit represented by Chemical Formula 1, a cyano group-containing second repeating unit represented by Chemical Formula 2, and a sulfonate group-containing third repeating unit represented by Chemical Formula 3 or Chemical Formula 4,
   the copolymer includes:
   49.9 mol % to 90 mol % of the first repeating unit,
   5 mol % to 50 mol % of the second repeating unit, and
   5 mol % to 20 mol % of the third repeating unit,

[Chemical Formula 1]

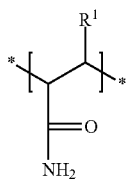

in Chemical Formula 1, $R^1$ is hydrogen or a substituted or unsubstituted alkyl group,

[Chemical Formula 2]

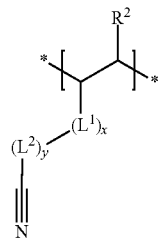

in Chemical Formula 2,
$R^2$ is hydrogen or a substituted or unsubstituted alkyl group,
$L^1$ is —C(=O)—, —C(=O)O—, —OC(=O)—, —O—, or —C(=O)NH—,
x is an integer of 0 to 2,
$L^2$ is a substituted or unsubstituted alkylene group, a substituted or unsubstituted cycloalkylene group, a substituted or unsubstituted arylene group, or a substituted or unsubstituted heterocyclic group, and
y is an integer of 0 to 2,

[Chemical Formula 3]

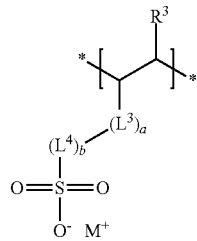

[Chemical Formula 4]

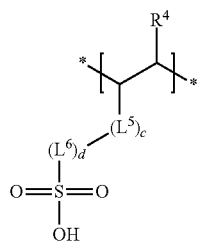

in Chemical Formulae 3 and 4,
$R^3$ and $R^4$ are independently hydrogen or a substituted or unsubstituted alkyl group,
$L^3$ and $L^5$ are independently —C(=O)—, —C(=O)O—, —OC(=O)—, —O—, or —C(=O)NH—,
$L^4$ and $L^6$ are independently a substituted or unsubstituted alkylene group, a substituted or unsubstituted cycloalkylene group, a substituted or unsubstituted arylene group, or a substituted or unsubstituted heterocyclic group,
a, b, c, and d are independently an integer of 0 to 2, and
M is an alkali metal.

2. The negative electrode as claimed in claim 1, wherein a weight average molecular weight (Mw) of the copolymer is 200,000 to 700,000.

3. The negative electrode as claimed in claim 1, wherein a glass transition temperature of the copolymer is 130° C. to 160° C.

4. The negative electrode as claimed in claim 1, wherein the copolymer is included in the negative active material layer in an amount of 3 wt % to 20 wt %, based on 100 wt % of the negative active material layer.

5. The negative electrode as claimed in claim 1, wherein the Si-containing negative active material includes:
Si,
$SiO_x$, in which $0<x<2$,
a Si-Q alloy, in which Q is an alkali metal, an alkaline-earth metal, a Group 13 element, a Group 14 element, a Group 15 element, a Group 16 element, a transition metal, a rare earth element, or a combination thereof, but Q is not Si,
a Si-carbon composite, or
a combination thereof.

6. The negative electrode as claimed in claim 1, wherein a thickness of the negative electrode is 30 μm to 120 μm.

7. A rechargeable lithium battery, comprising:
the negative electrode as claimed in claim 1;
a positive electrode including a positive active material; and
a non-aqueous electrolyte.

8. A negative electrode for a rechargeable lithium battery, the negative electrode comprising:
a negative active material layer including a silicon (Si)-containing negative active material, and
a binder,
wherein:
the binder includes an acryl copolymer consisting of an amide group-containing first repeating unit represented by Chemical Formula 1, a cyano group-containing second repeating unit represented by Chemical Formula 2, and a sulfonate group-containing third repeating unit represented by Chemical Formula 3 or Chemical Formula 4,
an amount of the acryl copolymer is 3 wt % 20 w %, based on 100 wt % of the negative active material layer,
the copolymer includes:
49.9 mol % to 90 mol % of the first repeating unit,
5 mol % to 50 mol % of the second repeating unit, and
5 mol % to 20 mol % of the third repeating unit,

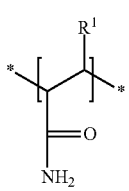

[Chemical Formula 1]

in Chemical Formula 1, $R^1$ is hydrogen or a substituted or unsubstituted alkyl group,

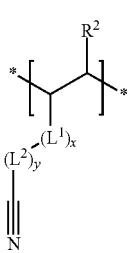

[Chemical Formula 2]

in Chemical Formula 2,
$R^2$ is hydrogen or a substituted or unsubstituted alkyl group,
$L^1$ is —C(=O)—, —C(=O)O—, —OC(=O)—, —O—, or —C(=O)NH—,
x is an integer of 0 to 2,
$L^2$ is a substituted or unsubstituted alkylene group, a substituted or unsubstituted cycloalkylene group, a substituted or unsubstituted arylene group, or a substituted or unsubstituted heterocyclic group, and
y is an integer of 0 to 2,

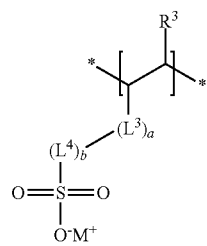

[Chemical Formula 3]

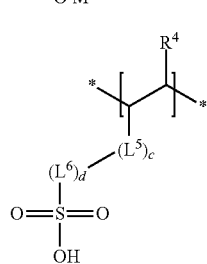

[Chemical Formula 4]

in Chemical Formulae 3 and 4,
$R^3$ and $R^4$ are independently hydrogen or a substituted or unsubstituted alkyl group,
$L^3$ and $L^5$ are independently —C(=O)—, —C(=O)O—, —OC(=O)—, —O—, or —C(=O)NH—,
$L^4$ and $L^6$ are independently a substituted or unsubstituted alkylene group, a substituted or unsubstituted cycloalkylene group, a substituted or unsubstituted arylene group, or a substituted or unsubstituted heterocyclic group,
a, b, c, and d are independently an integer of 0 to 2, and
M is an alkali metal.

9. A negative electrode for a rechargeable lithium battery, the negative electrode comprising:
a negative active material layer including a silicon (Si)-containing negative active material, and
a binder,
wherein:
the binder includes a copolymer consisting of an amide group-containing first repeating unit represented by Chemical Formula 1, a cyano group-containing second repeating unit represented by Chemical Formula 2, and a sulfonate group-containing third repeating unit represented by Chemical Formula 3 or Chemical Formula 4,
the copolymer includes:
49.9 mol % to 90 mol % of the first repeating unit,
5 mol % to 50 mol % of the second repeating unit, and
5 mol % to 20 mol % of the third repeating unit,

[Chemical Formula 1]

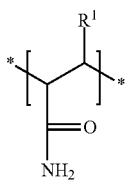

in Chemical Formula 1, $R^1$ is hydrogen or a substituted or unsubstituted alkyl group,

[Chemical Formula 2]

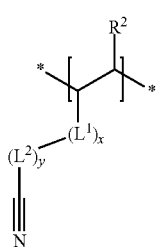

in Chemical Formula 2, $R^2$ is hydrogen or a substituted or unsubstituted alkyl group, $L^1$ is —C(=O)—, —C(=O)O—, —OC(=O)—, —O—, or —C(=O)NH—, x is an integer of 0 to 2, $L^2$ is a substituted or unsubstituted alkylene group, a substituted or unsubstituted cycloalkylene group, a substituted or unsubstituted arylene group, or a substituted or unsubstituted heterocyclic group, and y is an integer of 0 to 2,

[Chemical Formula 3]

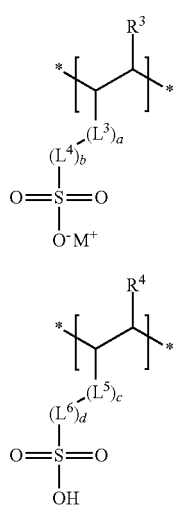

[Chemical Formula 4]

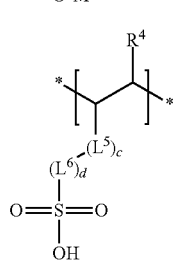

in Chemical Formulae 3 and 4, $R^3$ and $R^4$ are independently hydrogen or a substituted or unsubstituted alkyl group, $L^3$ and $L^5$ are independently —C(=O)—, —C(=O)O—, —OC(=O)—, —O—, or —C(=O)NH—, $L^4$ and $L^6$ are independently a substituted or unsubstituted alkylene group, a substituted or unsubstituted cycloalkylene group, a substituted or unsubstituted arylene group, or a substituted or unsubstituted heterocyclic group, a, b, c, and d are independently an integer of 0 to 2, and M is an alkali metal.

10. A negative electrode for a rechargeable lithium battery, the negative electrode comprising:

a negative active material layer including a silicon (Si)-based negative active material, and a binder, wherein:

the binder includes a copolymer including an amide group-containing first repeating unit represented by Chemical Formula 1, a cyano group-containing second repeating unit represented by Chemical Formula 2, and a sulfonate group-containing third repeating unit represented by Chemical Formula 3 or Chemical Formula 4, the copolymer includes:

49.9 mol % to 95 mol % of the first repeating unit, 5 mol % to 50 mol % of the second repeating unit, and 0.1 mol % to 20 mol % of the third repeating unit,

[Chemical Formula 1]

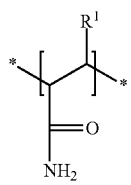

in Chemical Formula 1, $R^1$ is hydrogen or a substituted or unsubstituted alkyl group,

[Chemical Formula 2]

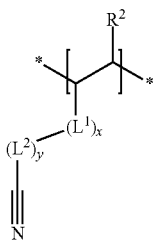

in Chemical Formula 2, $R^2$ is hydrogen or a substituted or unsubstituted alkyl group, $L^1$ is —C(=O)—, —C(=O)O—, —OC(=O)—, —O—, or —C(=O)NH—, x is an integer of 0 to 2, $L^2$ is a substituted or unsubstituted alkylene group, a substituted or unsubstituted cycloalkylene group, a substituted or unsubstituted arylene group, or a substituted or unsubstituted heterocyclic group, and y is an integer of 0 to 2,

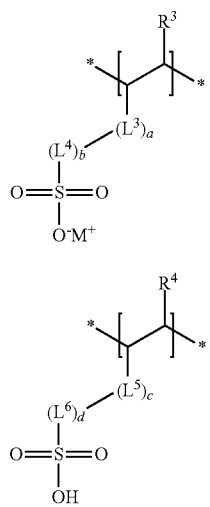

[Chemical Formula 3]

[Chemical Formula 4]

in Chemical Formulae 3 and 4,

R³ and R⁴ are independently hydrogen or a substituted or unsubstituted alkyl group, L³ and L⁵ are independently —C(=O)—, —C(=O)O—, —OC(=O)—, —O—, or —C(=O)NH—, L⁴ and L⁶ are independently a substituted or unsubstituted alkylene group, a substituted or unsubstituted cycloalkylene group, a substituted or unsubstituted arylene group, or a substituted or unsubstituted heterocyclic group, a, b, c, and d are independently an integer of 0 to 2, and M is an alkali metal.

11. The negative electrode as claimed in claim 10, wherein the Si-based negative active material includes $SiO_x$, in which $0<x<2$, a Si-carbon composite, or a combination thereof.

12. The negative electrode as claimed in claim 11, wherein the Si-carbon composite comprises a core including crystalline carbon and silicon particles and an amorphous carbon coating layer disposed on the surface of the core.

13. The negative electrode as claimed in claim 10, wherein a weight average molecular weight (Mw) of the copolymer is 200,000 to 700,000.

14. The negative electrode as claimed in claim 10, wherein a glass transition temperature of the copolymer is 130° C. to 160° C.

15. The negative electrode as claimed in claim 10, wherein the copolymer is included in the negative active material layer in an amount of 3 wt % to 20 wt %, based on 100 wt % of the negative active material layer.

* * * * *